United States Patent
Sbaiz et al.

(10) Patent No.: US 9,953,438 B2
(45) Date of Patent: Apr. 24, 2018

(54) IMAGE ANNOTATION ON PORTABLE DEVICES

(75) Inventors: Luciano Sbaiz, Zurich (CH); Martin Vetterli, Grandvaux (CH)

(73) Assignee: Ecole Polytechnic Federale De Lausanne (EPFL) (CH)

( * ) Notice: Subject to any disclaimer, the term of this patent is extended or adjusted under 35 U.S.C. 154(b) by 778 days.

(21) Appl. No.: 13/060,777

(22) Filed: Feb. 25, 2011

(65) Prior Publication Data

US 2012/0300089 A1    Nov. 29, 2012

Related U.S. Application Data

(63) Continuation of application No. PCT/EP2009/061361, filed on Sep. 2, 2009.

(Continued)

(51) Int. Cl.
*G06F 17/00* (2006.01)
*G06T 11/00* (2006.01)
(Continued)

(52) U.S. Cl.
CPC .......... *G06T 11/00* (2013.01); *G06K 9/00671* (2013.01); *G06K 9/00979* (2013.01); *G06T 19/006* (2013.01); *H04N 1/00323* (2013.01); *H04N 1/32203* (2013.01); *H04N 1/32229* (2013.01); *H04N 1/387* (2013.01); *H04N 2201/0084* (2013.01);
(Continued)

(58) Field of Classification Search
CPC ....................................................... H04N 5/228
USPC ......................................................... 715/230
See application file for complete search history.

(56) References Cited

U.S. PATENT DOCUMENTS 6,208,353 B1    3/2001   Ayer et al.
2002/0075282 A1*  6/2002   Vetterli ................ G01C 21/20
                                                        345/632
(Continued)

FOREIGN PATENT DOCUMENTS

EP          1246080 A2      2/2002
EP          1622081 A1      2/2006
(Continued)

OTHER PUBLICATIONS

International Search Report with Written Opinion for PCT/EP2009/061361 dated Mar. 8, 2011.

*Primary Examiner* — Mustafa A Amin
(74) *Attorney, Agent, or Firm* — Blank Rome LLP

(57) ABSTRACT

A system for automated annotation of images and videos points a mobile device towards an object of interest, such as a building or landscape scenery, for the device to display an image of the scene with an annotation for the object. An annotation can include names, historical information, and links to databases of images, videos, and audio files. Different techniques can be used for determining positional placement of annotations, and, by using multiple techniques, positioning can be made more precise and reliable. The level of detail of annotation information can be adjusted according to the precision of the techniques used. A trade-off can be taken into account between precision of annotation and communication cost, delay and/or power consumption. An annotation database can be updated in a self-organizing way. Public information as available on the web can be converted to annotation data.

11 Claims, 9 Drawing Sheets

| LOCATION | ELEVATION | SAMPLE IMAGES | 3D MODELS | ANNOTATION |
|---|---|---|---|---|
| . | . | . | . | . |
| . | . | . | . | . |
| . | . | . | . | . |
| 46°31'00"N | 6°38'10"E | 500m | | |
| 46°31'01"N | 6°38'09"E | 468m | | CATHEDRAL |
| 46°30'58"N | 6°38'15"E | 375m | | CASTLE |
| | | | | OUCHY |
| . | . | . | . | . |
| . | . | . | . | . |
| . | . | . | . | . |

Related U.S. Application Data

(60) Provisional application No. 61/190,752, filed on Sep. 2, 2008.

(51) Int. Cl.
| | | |
|---|---|---|
| *H04N 1/00* | (2006.01) | |
| *H04N 1/32* | (2006.01) | |
| *H04N 1/387* | (2006.01) | |
| *G06T 19/00* | (2011.01) | |
| *G06K 9/00* | (2006.01) | |

(52) U.S. Cl.
CPC ............. *H04N 2201/0089* (2013.01); *H04N 2201/3226* (2013.01); *H04N 2201/3253* (2013.01); *H04N 2201/3266* (2013.01); *H04N 2201/3273* (2013.01)

(56) References Cited

U.S. PATENT DOCUMENTS

| | | | |
|---|---|---|---|
| 2006/0085786 A1* | 4/2006 | Hayhow et al. | 718/100 |
| 2006/0257031 A1* | 11/2006 | Abramoff | G06K 9/6277 382/224 |
| 2008/0059872 A1* | 3/2008 | Tseng et al. | 715/231 |
| 2009/0083332 A1* | 3/2009 | Datta et al. | 707/104.1 |
| 2009/0204637 A1* | 8/2009 | Li | G06F 17/3025 |

FOREIGN PATENT DOCUMENTS

| | | |
|---|---|---|
| EP | 1995949 A1 | 11/2008 |
| WO | 05114476 A1 | 12/2005 |
| WO | 105473 A2 | 10/2006 |
| WO | 22007108200 A1 | 9/2007 |

\* cited by examiner

| LOCATION | ELEVATION | SAMPLE IMAGES | 3D MODELS | ANNOTATION |
|---|---|---|---|---|
| ... | ... | | | ... |
| 46°31'00"N 6°38'10"E | 500m | | | CATHEDRAL |
| 46°31'01"N 6°38'09"E | 468m | | | CASTLE |
| 46°30'58"N 6°38'15"E | 375m | | | OUCHY |
| ... | ... | | | ... |
Fig. 3
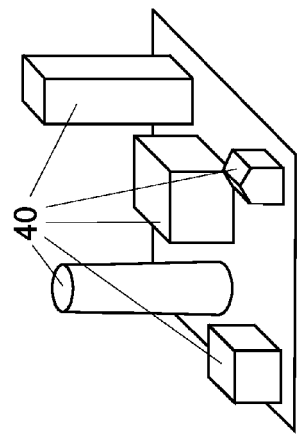
Fig. 4B
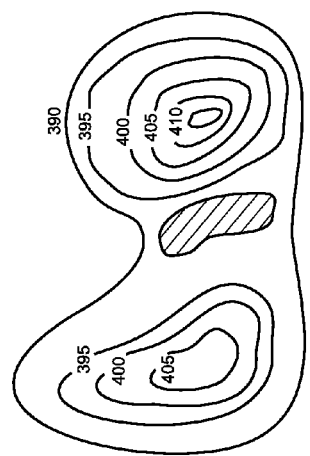
Fig. 4a

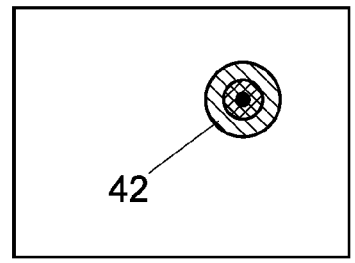
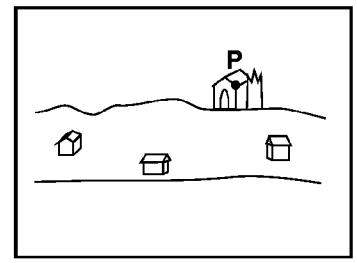
Fig. 6A  Fig. 6B
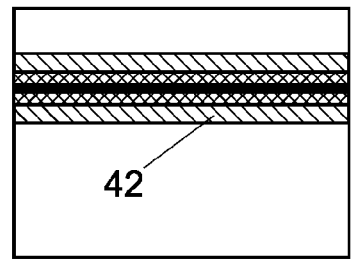
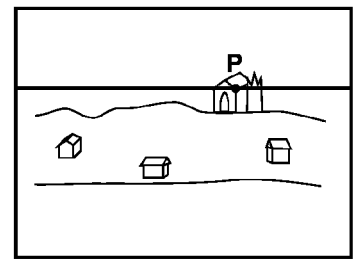
Fig. 7A  Fig. 7B
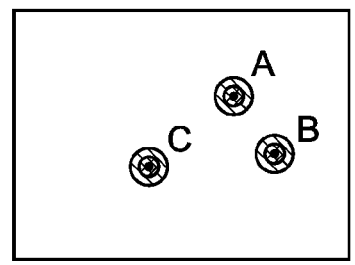
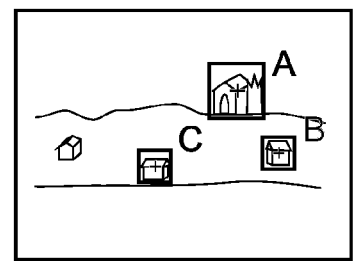
Fig. 8A  Fig. 8B

IMAGE ANNOTATION ON PORTABLE DEVICES

RELATED APPLICATIONS

This application is a continuation of PCT/EP2009/061361 (WO 026170), filed Sep. 2, 2009, and claims priority to U.S. Application 61/190,752, filed Sep. 2, 2008, which are hereby incorporated in their entirety by reference.

FIELD OF THE INVENTION

The present invention is concerned with methods for annotating images and videos on portable display devices and, more particularly, on such devices in a wireless communication network.

BACKGROUND OF THE INVENTION

Rapid progress in the development of hand-held portable devices such as smart phones, palmtop computers, portable media players, personal-digital-assistant (PDA) devices and the like, has led to proposed inclusion of novel features and applications involving image processing. In such an application, namely image annotation or captioning, a user points a portable device towards a scene, e.g. an alpine landscape, a building, or a painting in a museum, and the display shows the image together with superposed information concerning the scene. Such information can include names, e.g. for mountains and habitations, historical information for buildings, and commercial information such as advertising, e.g. a restaurant menu.

Annotation information can be supplied to portable devices by servers in a wireless communication network. A corresponding functional configuration of a communication network with servers and portable devices here will be designated as an annotation system.

In an annotation system, specific concerns are with precision and robustness of annotation positions. Precision can be enhanced by simultaneous use of different techniques such as sensor- and image-based techniques, and robustness by choice of techniques for determining annotation positions. Once an image is acquired by a mobile device, different techniques can be used to determine the placement of annotations in the image. Example of methods and systems using different techniques for annotating an image are described among other in U.S. Pat. No. 6,208,353 and in EP1246080.

EP1622081 describes a video object recognition device for recognizing an object contained in a video image and for annotating this object. Candidate searching means reads the positional information of the object recognizing device and of geographical candidate objects stored in a database. This device then searches for geographical objects that have possibly been imaged and performs a visual comparison between those candidate objects and the image. Presence probability calculating means calculate the probability that an image of the candidate object is captured, and similarity calculating means calculate the similarity between the candidate object and a visual feature of the video image. The presence probability and the similarity are then used to determine whether an image of an object is captured or not. This method is useful for determining whether or not a particular object should be annotated, but does not indicate the most likely position of the salient point, or the position of the image where the annotation should be added.

WO05114476 describes a mobile image-based information retrieval system including a mobile telephone and a remote recognition server. In this system, the image taken with the camera of the mobile phone is transmitted to a remote server where the recognition process is performed. This leads to high bandwidth needs for transmitting the image, and to a delay for computing the annotations in the server and transferring them back to the mobile phone. Again, this system delivers a similarity score which is compared to a predefined threshold to decide whether or not an object is visible in the image, but does not indicate the most likely position of this object in the image.

WO2007/108200 describes a camera and an image processing program for inserting an inserting-image at an appropriate position of an image. It is concerned with identifying in a scene important objects that should not be obscured by an added annotation. The image plane is divided into 25 (5×5) small areas. The positioning of this inserting-image is related to an object distribution evaluation value calculated by the CPU of the camera, by using a face distribution evaluation value, a contrast distribution evaluation value and weights. The inserting position is selected among the small areas of the image plane included in the first row and the fifth row having the minimum object distribution evaluation value.

A system for automated annotation of images and videos points a mobile device towards an object of interest, such as a building or landscape scenery, for the device to display an image of the scene with an annotation for the object. An annotation can include names, historical information, and links to databases of images, videos, and audio files. Different techniques can be used for determining positional placement of annotations, and, by using multiple techniques, positioning can be made more precise and reliable. The level of detail of annotation information can be adjusted according to the precision of the techniques used. Required computations can be distributed in an annotation system including mobile devices, servers and an inter-connecting network, allowing for tailoring of annotated images to mobile devices of different levels of complexity. A trade-off can be taken into account between precision of annotation and communication cost, delay and/or power consumption. An annotation database can be updated in a self-organizing way. Public information as available on the web can be converted to annotation data.

BRIEF SUMMARY OF THE INVENTION

An aim of the invention is to make a better use of the different sensors and methods which are available in a mobile annotating device for determining the position and orientation of the device and of the imaged objects.

Another aim is to improve the placement of the annotation in the image, in particular when different positions could be considered or when there is an ambiguity related to the optimal position in the image.

According to the invention, these aims are achieved by means of a computerized method for placing an annotation on an image of a scene, comprising the steps of:

(a) obtaining an original image of said scene with a camera;

(b) obtaining an annotation for a feature of said scene represented in said image;

(c) for each position of a plurality of positions in said image, determining a probability of having said feature at said position; and (d) forming the annotated image by including said annotation at an annotation position in said image where said probability is the highest.

further comprising (e) determining the position of said camera with a location sensor, (f) using computer vision means for determining a similarity between said feature and reference images or models of said feature;

(g) computing a probability distribution function indicating the probability of having said feature at each of said positions in said image, based on information from said location sensor and on information from said computer vision means.

The invention concerns also an annotating device for placing an annotation on an image of a scene according to the above and an annotating system for placing an annotation on an image of a scene according to the above.

A preferred method determines a 2D or 3D probability distribution, here termed a probability mask, that represents the probability with which a designated object is represented at each point of the image. This probability depends on the method used for determining the position of a salient object in the image. For example, an image-based method that calculates similarities between reference candidate objects and features of the image by using computer vision can determine the position of an object with high precision under normal lighting conditions. But when the illumination is too low, or when many objects of similar appearance are present in the same scene, the method can produce several candidates, i.e. several regions with a nonzero probability of representing the candidate object. In other situations, computer-vision methods are unable to recognize the candidate object present in the image, and deliver a zero or sensibly uniform probability distribution.

The probability mask can be generated based on information delivered by positioning sensors as well. For example, if a positioning system such as GPS is available in the annotating device, together with a compass and inclinometers on the three axes, the position and orientation of the device can be computed with high precision, and the high probability values of the probability mask are distributed around a certain image point. The size of the nonzero region is determined from the precision of the position and the orientation angles. Different portable devices can include different sets of sensors, yielding probability masks with different shapes and sizes. For example, if an annotating device has a GPS and inclinometers, but no compass, only the yaw and roll angles of the device can be determined, but not the direction. This case will correspond to a non zero region of the probability mask with the shape of a stripe, or a disk in 3D.

Other sensors which can be attached or included in the annotating device include multi-axis accelerometers and/or gyroscopes, from which the past trajectory of the device can be determined, as well as the vertical direction.

Other sensors may also be attached to the objects to annotate and emit a signal received by the image acquisition device. Those sensors may include RFID tags, beacons, or radio emitters such as Bluetooth, WIFI or ZigBee senders for example. The annotation device can determine the direction and possibly the distance to this sensor, based for example on time-of-flight and/or amplitude measurements, and use the information included in the radio signal for identifying the object. In this case, the non zero region of the probability mask may be a circle, respectively a sphere of relatively large diameter.

Further to using image-based methods and/or sensors, position and orientation of a mobile device can be determined by using information available to stations or components of a communication network. For example, the position of the annotating device can be computed by triangulation, using time-of-flight and/or amplitude of the signals sent or received by network base stations at different locations.

Another possibility is to determine simultaneously the position and orientation of multiple mobile devices. Some of the devices may have sensors of one type or another, making for enhanced-precision determination which also can benefit other annotating devices in the network. For example, a device may have a GPS and be in the proximity of a second device not so equipped. If the two devices can communicate, for example over a near-range wireless interface, a ranging technique can be used to determine the distance between them, and an estimate of the position of the second device can be furnished to the first device.

Irrespective of the techniques used to determine position and orientation, the result will amount to a mapping of the salient object onto the image plane, with a precision represented by the probability mask.

Independently of the precision of each technique, some techniques are more reliable than others. For example, sensor-based techniques are usually more reliable than image-based techniques, which can deliver false positives or false negatives. The reliability of a particular technique may be known a priori, and stored as a predefined value retrieved by the algorithm. Or it may depend on the image and/or condition, and delivered by the corresponding sensor or algorithm used by the different techniques. For example, the reliability of an image-based method may be delivered as an output of the computer vision algorithm, and depend on the image acquisition conditions. In another example, the reliability of a satellite-based location sensor may be output by the GPS chipset and algorithm, and depend on the number of GPS signals that are received and on the position of the satellites, among others.

Furthermore, the reliability associated to different portions of the image and to different candidate objects may be different; an image may for example comprise well lighted portions, for which a computer-vision algorithm can deliver reliable results, and other portions which are under- or over-exposed, or not well focused, and for which the reliability of the method is more problematic. Moreover, some objects are easier to recognize with high reliability than other less distinctive objects. In another example, the reliability of methods based on a radio path between the object to annotate and the annotating device may depend on the distance, obstacles and reflexions, among other. Thus, a reliability distribution function may be computed that indicates the reliability of the measure at each point of the image.

In addition, the precision of positioning depends on the different measures, and possibly on each candidate object and on each point of an image. For example, a candidate object with sharp edge may be easier to position with high precision over a reference image than another object with blurred edges. In a similar way, the precision of a GPS positioning system is far from being constant. Therefore, a precision (or average location error) may be associated to each image, to each candidate object and/or to each point of an image.

Robustness and precision can be maximized by combining the estimates produced by the different techniques, taking into account the probability masks and possibly the reliability masks. One way to increase robustness is to compute the intersection between the probability masks of the different techniques. If the intersection is empty, or if the regions of high probability delivered by the two techniques are not overlapping, then the two techniques are not coherent. In this case, the result of the less reliable technique, for example the image-based technique, should be discarded or at least given less weight.

More generally, a hierarchy of reliability can be defined for the different techniques. If the results of the techniques are not coherent, i.e. the intersection of the probability masks is empty, then the least reliable technique (or less reliable for regions of high probability as indicated by other techniques) should be discarded and the procedure repeated as applied to the set of remaining techniques. Once a set of coherent techniques is determined, a precise projection of the salient object position can be determined by combining the measurements generated by the techniques of the set. For example, a simple way to combine the measurements is by weight averaging, with weights being derived from the probability masks.

The final precision of the mapping of the salient objects on the input image can be used to determine the level of detail of the annotations. For example, if the position of a group of objects can be determined only with low precision, instead of annotating each individual object, the group may be annotated as a single unit. This can be effected by using a multi-resolution representation of the objects. For example, an historical building may have different sub-parts, e.g. statues, architectural elements, and the like, which may be annotated independently of the building itself. Those sub-parts can be grouped into a single object associated with the annotation for the whole building. Or a group of buildings can be associated with a single annotation, corresponding to the part of the town, for example. In annotating, the level of resolution of the annotations can be determined by ascertaining the precision on the object positions for each resolution level. The selected level is the one that gives the maximum resolution, but such that the region of confusion of the annotated object positions do not overlap.

In summary, each or some of the methods can provide different values:

1) the probability of having a particular object at a particular location and/or in the whole image. This value may be computed for the whole image, and/or for each point of the image or a 3D scene. In case of a probability computed for each point, a probability density function (or probability mask) is computed that indicates the probability of having the object at a particular location. This probability density function may be computed in two dimensions in the plane of the image, and/or in three dimensions if a three dimensional model of the scene or of objects in the scene is available. This probability may be indicated by a real value, for example as a percentage. The points where the probability of having a particular candidate is not null, or at least higher than a threshold, together form a so-called the region of confusion.

2) the reliability, i.e., the probability that a salient object associated with an image or with a point of the image is not a false positive and that this object is indeed present. Again, this reliability may be a priori known or computed for a whole image, for different portions of the image, for each point in the image, and/or for a given candidate object. The reliability may be indicated by a real value, for example as a percentage.

3) the precision, i.e., the standard deviation of the error on the position. This precision can again be computed or a priori known for the whole image, for regions in the image, for each point in the image, or for a given candidate.

Those different values may further vary with time, for example in the case of annotation of video images.

The computations required for determining positions and orientations of the image annotation device, to apply the different techniques for mapping the salient objects onto the images, and to generate the final result can be distributed on different components of a complete annotation system. Such distribution can be optimized by taking into account the computing power of the mobile device and the other components of the system, i.e. the servers and the other mobile devices. Optimization may be for minimized delay in obtaining the annotated image or for minimized communication cost, for example. In a simple case, a mobile device with very limited processing power can simply send the acquired image to one of the servers together with the sensor information, and the server will generate the resulting image and send it back to the mobile device. In the case of a more powerful mobile device, models for the annotated objects in the proximity of the device may be downloaded, for all processing to be performed by the mobile device, without recourse to processing by a server. The first alternative is likely to be slower than the second, as the server may become overloaded. The second alternative is more expensive in terms of communication cost, as many of the downloaded models may not be used, but the annotation can be performed very rapidly. Intermediate to the two alternatives in a sense, computational load can be distributed among servers and mobile devices.

It is advantageous further to determine a trade-off between the precision of annotation positions and cost such as delay, communication cost, or energy consumed. Indeed, while combining multiple techniques can result in increased precision, it will increase the total cost. The trade-off can be determined by computing the cost of each technique and the corresponding precision, and then finding the optimal allocation of an available budget among the techniques.

Commercial viability of an annotation system will depend on the number of annotated objects available to users. For providing annotated objects to a database, there are three exemplary techniques as follows. The first allows users to upload annotated images or 3D models. This can be done directly from the mobile devices or through the World-Wide-Web. Being self-organized, this technique can potentially provide a large number of annotated objects, but it may be difficult to guarantee the quality of the service. In the second technique, a central institution generates the set of annotated objects for a region, e.g. a town, thus guaranteeing coherence and quality of content. The third exemplary technique involves use of images and data retrieved from pre-existing image and video databases such as the World-Wide Web. These often are found to be associated with position information, keywords, and links to web sites. Such information can be accessed in automated fashion to generate annotated objects for the mobile devices. Generating can be in real time upon a request concerning a scene or area of interest, obviating data duplication and making for simplified updating of annotations.

BRIEF DESCRIPTION OF THE DRAWINGS

FIG. 3 is a tabular representation of a database including entries for salient objects.

FIG. 4A is a contour map showing elevation of terrain.

FIG. 4B is a schematic representation of objects of a scene.

FIG. 6A is a graphic representation of a probability mask or "region of confusion" for the salient object position P of FIG. 6B.

FIG. 6B is a sketch of a scene including a salient position.

FIG. 7A is a representation of an exemplary probability mask for a candidate object when compass information is not available.

FIG. 7B is a sketch showing possible positions of the object shown in FIG. 7A.

FIG. 8A is a representation of a probability mask having three local maxima, for image-based detection of a candidate object in a scene having other similar objects.

FIG. 8B is a representation of a scene comprising three objects with similar appearance, corresponding to the probability mask of FIG. 8A.

DETAILED DESCRIPTION OF POSSIBLE EMBODIMENTS OF THE INVENTION

Figure 1:
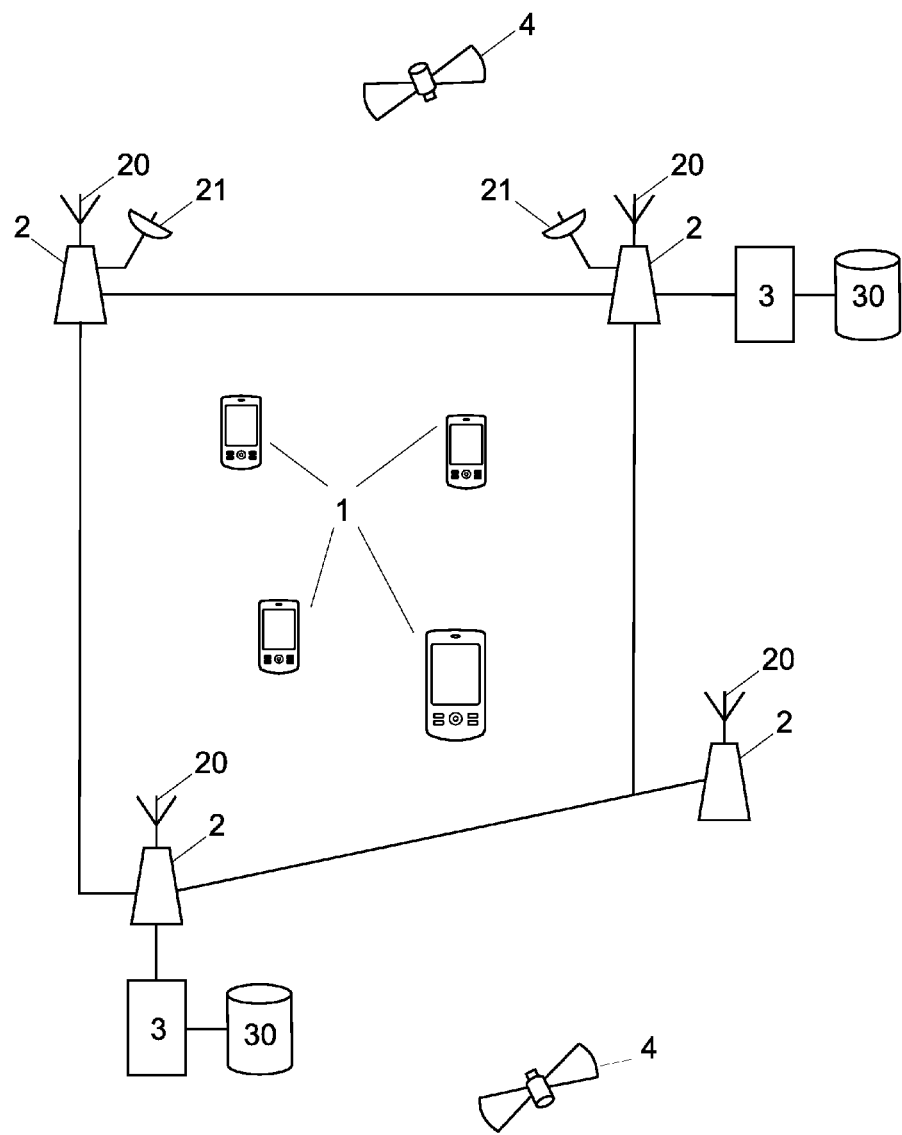
FIG. 1 is a schematic representation of an exemplary annotation system.

Different techniques can be used for image acquisition in an image/video annotation system. A technique can be based on the use of a sensor on the portable annotation device, for example, for the sensor to provide information concerning device position and orientation. Available sensors are characterized by differing precision and reliability. For example, the GPS system allows determining position with a precision dependent on the number of visible satellites. However, when the device is inside a building GPS determination becomes unreliable and a requisite position has to be acquired using an alternative, possibly less precise type of sensor, such as determination of position from a mobile phone network infrastructure.

From the sensor information, an annotation system can infer the scene observed by the annotating device and retrieve from a database a set of visible salient objects and their annotations. Sensor information can be used further to map the set of salient object positions to image coordinates, for superposing the annotations onto the image of the scene at the positions corresponding to the salient objects.

Other sensors may be attached to the objects to annotate, and emit a signal received by the annotation device. For example, a scene may include objects (including persons) marked or equipped with a RFID, Bluetooth, or ZigBee sender, or any sender or beacon that emits a radiofrequency, infrared or audio/ultrasonic signal which may be received by the image annotation device, and used for identifying those objects and/or for determining their position within the acquired image. This technique may be used for identifying and locating users and vehicles having radio mobile equipments, for instance.

As an alternative to the use of sensors, image processing and computer vision techniques (including face recognition algorithms) can be used for computing the similarity between reference images or models and features of the image. An image acquired by the annotating device is compared with reference images stored in a database in which each image corresponds to an object to be annotated. As actual viewing angle and lighting conditions can be different with respect to the images stored in the database, the comparison algorithm should remove the influence of these parameters. Alternatively, multiple images corresponding to different viewing angles and lighting conditions can be stored.

A further, more sophisticated image annotation technique uses 3D reference models. This technique is advantageous especially where the portable device is near an object to be annotated, i.e. where parallax is significant. In the case of a building, for example, the structure of the object is stored in the database together with the details to be annotated. The image acquired by the portable device is compared with the possible views of the 3D object and, if there is a match for one of the views, the object is recognized and the corresponding annotations are superposed onto the image.

Further to choices between sensor- and image-based techniques, choices are offered as to partitioning and distributing computational tasks between portable and server devices. If the portable device has low computing power, annotation may be performed entirely on the server side. Conversely, if the portable device is capable of performing the annotation tasks, all or parts of the database of annotation information can be downloaded on the device, without requiring processing on the server side. In the first case, costs arise in the form of delay in data exchange with the server and a higher computational load on the server. In the second case, a cost is incurred due to a larger amount of information downloaded from the server.

FIG. 1 shows an annotation system including four mobile devices 1 (including one or several annotating devices, for example mobile phones with annotating software and hardware capabilities) and four base stations 2. Each of the base stations has an antenna 20 for communicating with the mobile devices 1. Two of the stations are equipped further, each with another antenna 21, such as a satellite communication dish antenna 21, for communicating with satellites 4 which can serve for relaying communications and for positioning of the mobile devices, e.g. by using the Global Positioning System (GPS). Some mobile device may also include their own satellite positioning system, for example their own GPS receiver. The base stations are interconnected by communication links, e.g. land-line telephone connections. Base stations are connected to servers 3 and associated data bases 30, for example over the Internet. At least one of the mobile device 1 may include a digital camera, image annotating software and/or an annotation database. The mobile devices 1 can communicate with the base stations 2, with the servers 3 and possibly among each other to determine their location, the location of objects and to produce annotated images.

Figure 2:
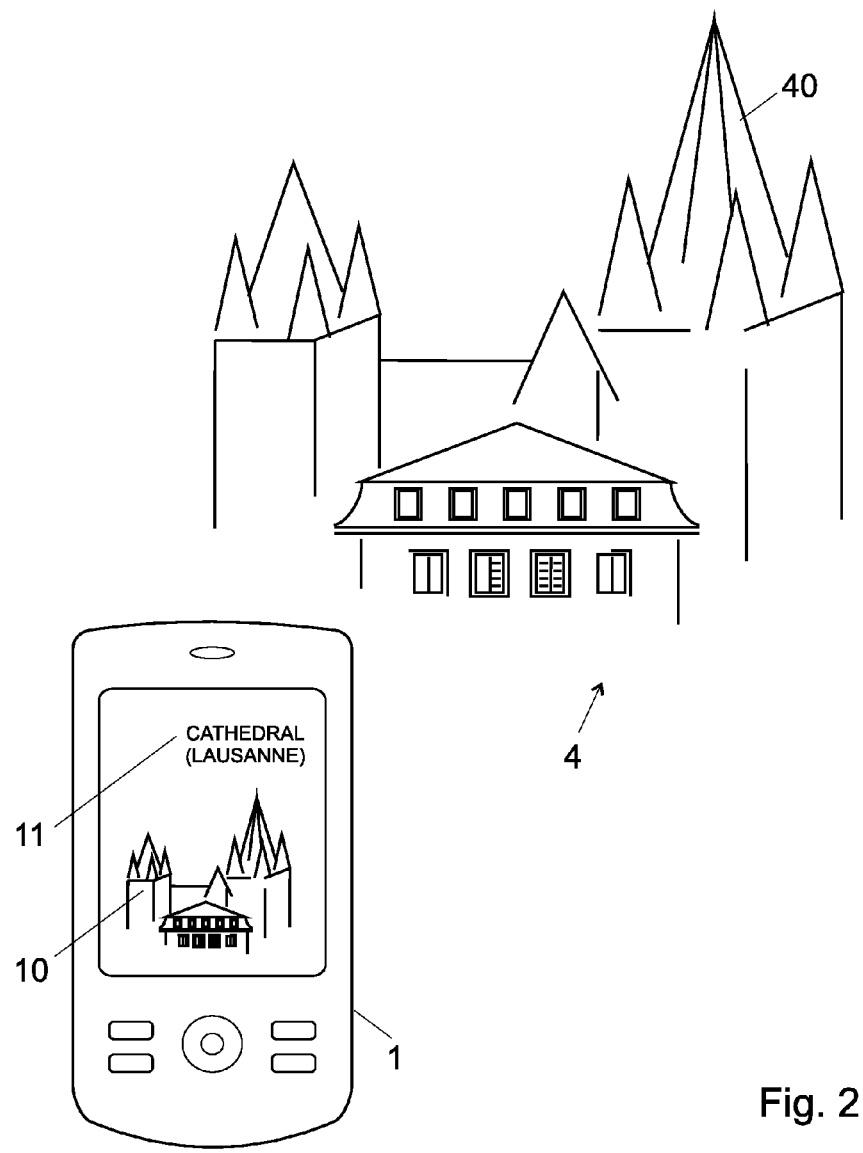
FIG. 2 is a depiction of an annotating mobile device of the annotation system, pointed at a building.

FIG. 2 shows an annotating mobile device 1 having acquired and displayed a view 10 of a scene 4 comprising at least one salient object 40, here the Cathedral of Lausanne, Switzerland, and with the displayed view 10 being annotated with text 11, here reading "Cathedral (Lausanne)". Other annotations added to an image may include links, bitmap images or graphical elements, eg. arrows, icons, pictograms, highlighting elements, etc.

First, for annotating a view 10 acquired by a mobile device 1, salient objects 40 are identified in the view. In a basic implementation, the salient objects are represented by points placed in a two or three dimensions coordinate system at the positions for which annotations are available in a database, for example. Or, salient objects may be represented by surface patches or regions, allowing a user to click on a region to obtain the annotation. In both cases the main information associated with salient objects is their position which may be obtained from one or several databases together with the corresponding annotations. To facilitate identification, multiple representations of the salient points can be used.

FIG. 3 illustrates a portion of an exemplary annotation database 30 which may be stored in a server 3 and/or in an annotating device 1. For each referenced object a database entry includes one or several among: geographic position using latitude, longitude and elevation, one or more images of the object, a 3D model (optional), and a desired annotation, e.g. text as shown here. A common image and/or 3D model may also be associated with several objects. Also, certain side information is stored, such as position and orientation of the camera that acquired the image, time and date when the picture was taken, settings of the camera, and the like. If the salient object is a surface patch rather than a point, the projection of a surface on each image is also stored. In an alternative representation, a set of images displaying the salient object can be included.

A further representation, e.g. of a building, can take the form of a 3D model. One way to represent the 3D model is to use a wire frame approximating the actual object surface. Additionally, texture can also be stored as reference. The salient object is positioned in 3 dimensions on the 3D model. As in the case of a 2D image, position can be indicated by a point or a 3D surface patch or volume. In the latter case, the patch can be projected on an image to determine the region of the salient object.

To advantage in some cases, an additional database or database entry can be used to facilitate determining which objects are visible from a certain location. Such a database preferably includes the elevation of the surfaces surrounding the mobile device. Elevation can be represented by a topographic map as exemplified by FIG. 4A, or by a geometric approximation of the objects 40 of a scene, as in FIG. 4B. In a practical implementation, for enhanced efficiency the two databases can be organized differently. Indeed, as images and 3D models may contain multiple salient objects, it can be advantageous to have different databases for 3D annotation positions, images, and 3D models. An entry of each database will be associated with one or several identifiers corresponding to the annotations.

Figure 5:
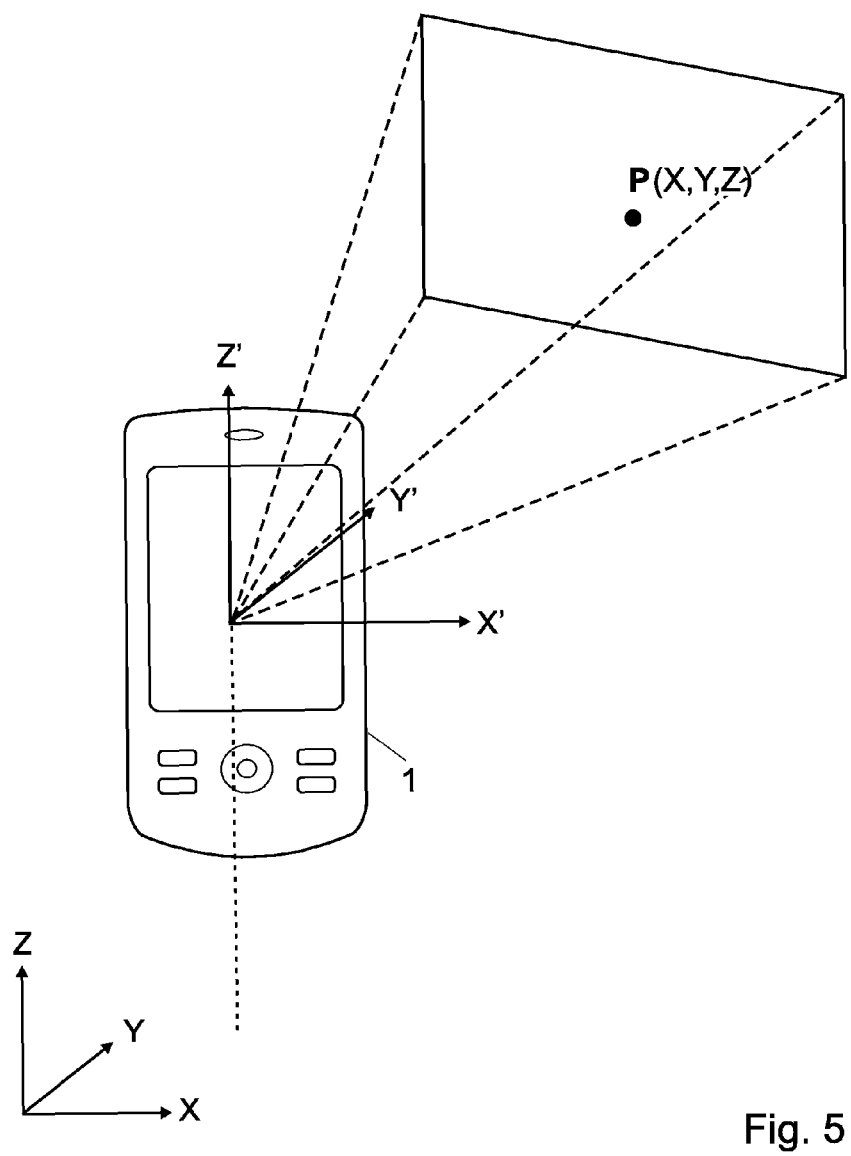
FIG. 5 is a schematic illustrating a mapping of a salient point onto a mobile device image plane.

In the case of sensor-based annotation, geographic locations can be used to determine which objects are visible by the device and which ones are hidden, involving determination of the mobile annotating device position and orientation. For example, this can be obtained by using a GPS, a compass, and inclinometers. The salient objects visible by the device are obtained by selecting the objects 40 in the database that are contained in the field of view 41 of the mobile device camera, as shown in FIG. 5. For the objects that are in the field of view and are not masked by other objects, the projection on the acquired image can be determined. This projection corresponds to the position where the annotation for the object should be placed.

The precision of each sensor influences the precision on the position of the projection. For example, in FIG. 6B the position P corresponds to one of the objects to be annotated. The uncertainty on the position P is represented by the probability distribution depicted in FIG. 6A, with black corresponding to a high probability and white to a low probability of having the object at this location. The probability distribution corresponds to a region of confusion 42 where the correct position is contained, and where the probability of having the candidate object P is greater than zero for each point in the region.

If the number and/or precision of sensors are not sufficient to determine without ambiguity the position of the object, it is still possible to determine the region where the object lies and a corresponding probability distribution. For example, if GPS and inclinometers are available, but no compass, it will be possible to determine a line-shaped region of confusion, parallel to the horizon, on which the object lies. This is depicted in FIGS. 7A and 7B. Correspondingly, the probability values are nonzero in the region of the lines. Even if the position of the object is not exactly determined, this probability mask can be combined with probability mask delivered by other techniques, such as sensor techniques and image-based techniques, to obtain the final annotation position with higher precision and reliability.

In image-based techniques, the acquired image is compared with a set of 2D reference images and/or with projections of 3D models of candidate objects. For example, in the database shown in FIG. 3, sample images and 3D models are associated to at least some of the salient objects. If an image or a projection of a candidate object is found at a certain position in the input image, then the position is recorded as a possible candidate for the annotation of the salient object under consideration. The algorithm used to find the position of the salient object in the image is characterized by a certain precision on the position, which depends on the sharpness, on the lighting conditions, on the object itself and on the number and quality of sample images for example. The search for candidate objects may be limited to objects which are most likely present in a scene, depending for example on a rough estimate of the field of view based on information from one or several sensors.

A computer-vision algorithm can determine several candidate positions for the same salient object. For example, in FIG. 8B, three possible positions (denoted as A, B, and C) for one candidate object are determined. As in the case of sensor-based techniques, the precision on the position of each candidate is represented by a probability distribution. For example, in FIG. 8A, the probability distribution for one candidate is shown. This probability distribution comprises three local maxima, corresponding to three features A, B, C of the image which are similar to the reference image of the candidate.

Other situations may occur where the computer vision algorithm does not find any match and any likely position for a candidate object, even if this object is present in the scene. Reliability of image based techniques tends to be lower than for other techniques, especially when the image acquisition conditions are difficult, or when several objects with a similar appearance are in the same scene.

As described above, the candidate positions for a salient object can be determined by using all information available in the annotation system. For example, measurements on the signals received by the base stations 2 can be used to deduce the position of the annotating mobile device 1 and finally the identity and position of the salient object P. Additional measurements can be obtained by mobile devices 1 in the proximity of the one considered. According to the configuration of the system and the applied algorithms, each candidate position will be characterized by a different probability distribution.

Moreover, a specific reliability is associated to the method, which indicates how likely the algorithm will give a meaningful result. Reliability is very high for sensor-based techniques, i.e. when the objects to be annotated are able to indicate their own identity and location, medium for techniques such as GPS and network-based geolocalisation of the mobile device, and lower for image based techniques.

Figure 9A:
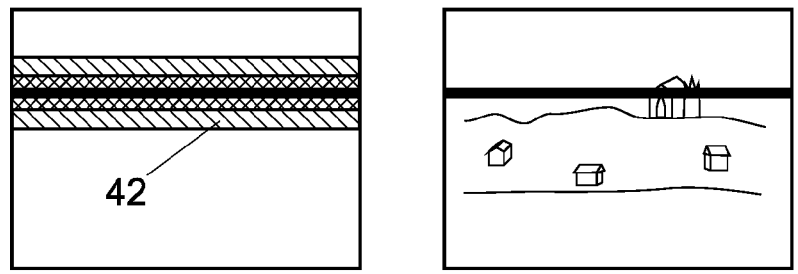
FIG. 9A to 9C are illustrations of detection of a salient object using multiple techniques.
Figure 9B:
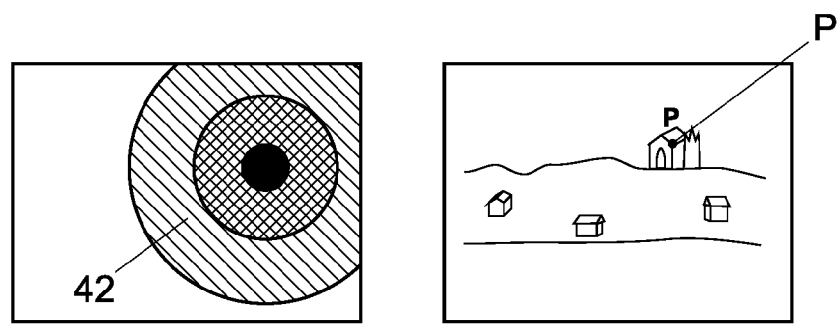
Figure 9C:
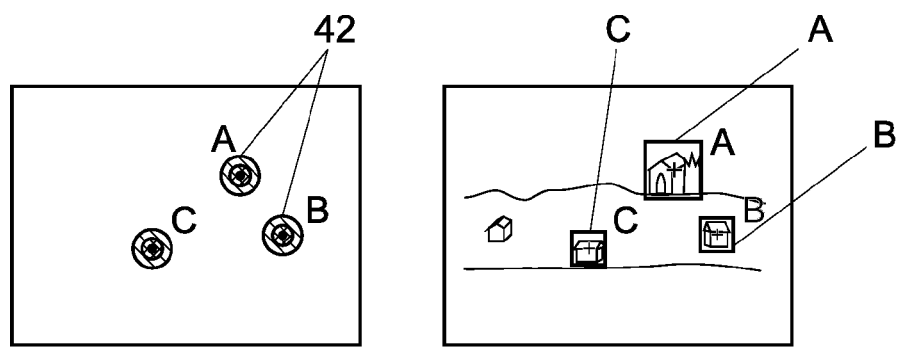

An example of the results given by the different techniques is shown in FIG. 9, for sensor-based (FIG. 9A), geolocalisation-based (9B) and image-based techniques (9C). For each technique, a typical shape of the uncertainty region (i.e. the portion of the image where the probability of having a candidate object is higher than a threshold) is shown.

The first method (FIG. 9A) uses a sensor installed in the mobile device and/or in the annotated objects 40: the result is very reliable, but only the vertical coordinate of the object is computed, and the region of uncertainty is stripe-shaped. The second technique (FIG. 9B) is based on measurement of the signals sent and/or received at the base stations 2 of a mobile network. In this case, the position of the mobile annotating device 1 and of the objects is fully computed, but with low precision, i.e. the region of confusion is large. The reliability is medium, since in some rare cases multi-path may lead to an incorrect localization of the mobile device. The third technique (FIG. 9C) is image based and produces several candidates for the same object. The position of each candidate is computed with high precision, but the reliability is low, since the method depends on the image acquisition conditions.

For each method, the reliability can depend on the condition, and be determined for each image or even for each point of an image. For example, as previously mentioned, the reliability of computer vision based techniques strongly depends on lighting conditions, focus and number of candidates in the field of view. Reliability of GPS based techniques depend on the number of satellites from which a signal is received, among other. Thus, a new reliability index can be computed for each image to annotate and for each technique, and compared with a threshold in order to determine whether this technique provides useful results.

The candidates of the different methods for identifying and locating a salient object on a picture can be analyzed to remove those candidates that are not coherent with the most reliable ones. A first possible procedure to place a candidate object in an image is as follows:
1. Consider each method M in order of increasing reliability.
2. Consider each possible position given by M for an object, and check if it is compatible with the positions given by the other methods. If not, remove the position.
3. Are there possible positions remaining for M? If not, remove method M.
4. If there are methods not analyzed, return to step 1.

Figure 10A:
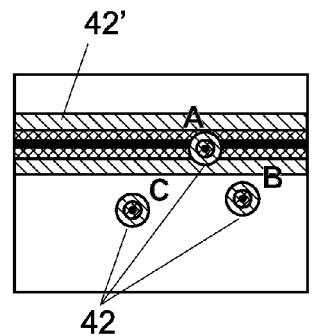
FIG. 10A is an illustration of comparison of the probability masks for a single-candidate sensor-based method and a three-candidate image-based method.

For example, in FIG. 10A the circular uncertainty regions 42 of the image-based algorithm is compared with the stripe-shaped uncertainty region 42' delivered by the sensor-based method. Only the candidate A of the image based technique is compatible with the uncertainty region of the sensor based technique, since there is a region where both probability masks are non zero. In this case, the candidates B and C of the image based technique are discarded. Within the portion of overlap of the two uncertainty regions, the algorithm will locate the salient object at the point where the combined probability, or weighted combined probability, is the highest.

Another possible procedure to place a candidate object in an image is as follows:
1. Consider each method M.
2. Remove all methods for which the reliability index for the current image is under a predefined threshold.
3. For each salient object identified in the field view, determine its most likely position in the image. This most likely position is preferably based on probability distribution function delivered by the different remaining techniques. This may include a step of averaging the probabilities delivered by each technique for each point, or a weighted averaging where the weights associated with each probability depend on the reliability of each technique.

A third method can be used, especially when a reliability distribution function that indicates the reliability of each or some methods at each point is available:
1. Consider successively each point of an image.
2. Remove each method whose reliability at the point is under a predefined threshold.
3. Compute an average of the probabilities given by the remaining methods having one candidate salient object at the point.
4. Are there more points in the image? If Yes, go back to step 1.
5. Choose a position for the annotation which depends on the point of highest average probability if this average probability is higher than a given threshold, otherwise discard the annotation.

Thus, in all the methods, the candidate object is located at the point of highest probability, i.e. at the point which indicates the most likely position for the candidate. This point of highest probability is based on the probability masks associated with the different sensors, for example by averaging the probability distribution functions. Methods which are not reliable enough, or not reliable at a specific point, are discarded. The method is repeated for all candidate objects that may be found in a scene.

More generally, once a set of compatible candidates is determined, the final position of the annotation is computed by combining the positions given by the different methods.

In one embodiment, the calculation of the most likely position takes into account the precision of each method. For example, a weighted average can be used, such as $$x = \left(\sum_i xi/\sigma xi\right) \Big/ \left(\sum_i 1/\sigma xi\right)$$

$$y = \left(\sum_i yi/\sigma yi\right) \Big/ \left(\sum_i 1/\sigma yi\right)$$

where (xi, yi) is the position of the candidate i and (x, y) is the final position of the annotation. The parameters σxi, σyi are the standard deviations of the error on the position of candidate i and they are associated to the size of the region of confusion; those deviations depend on each method, and often on each measure. A precision on the final position can be computed from the probability distribution of the compatible candidates. For example, this can be achieved by computing an estimate for standard deviations of the final position.

Figure 10B:
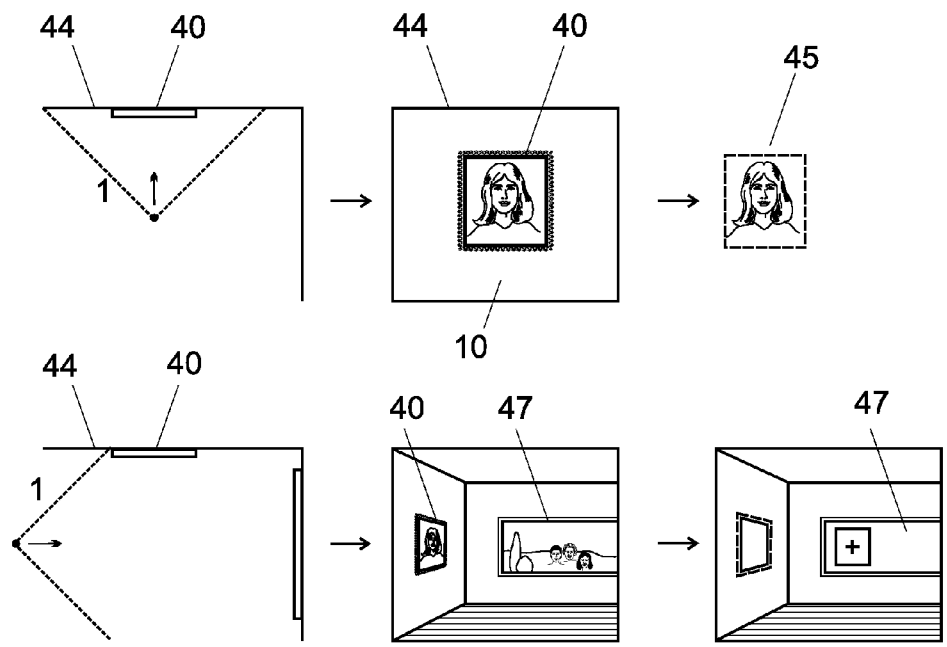
FIG. 10B, top row, is an illustration of acquisition of an image stored in an annotation database, and FIG. 10B, bottom row, of annotation of an image taken with different orientation.

Another way to increase the precision and robustness of the final annotation positions is to apply jointly multiple techniques, instead of independently. In this way it is possible to combine for example sensor measurements and image based techniques. In fact, as mentioned image based techniques may be sensitive to the position of the observer. For example, if a 2D model is used to determine the match between a certain region of the input image and a reference image, then a 3D rotation of the mobile device may lead to an incorrect or a missed match. This is depicted in FIG. 10B. The top images represent the acquisition of a reference image stored in the annotation database 30. The annotated object 40 is on a planar surface, which is parallel to the image plane of the camera 1, producing the reference image 45 stored in the database and which is a 2D scaled representation of the annotated object viewed from this particular viewing angle. Instead, as depicted in the bottom images, when the mobile device 1 is used to produce an annotated image, the camera plane is not necessarily parallel to the plane used during generation of the reference image and to the annotated object, and may be parallel to another object 47. With different orientation, if matching between the images in the database and the acquired image does not take into account perspective projection, e.g. if a 2D translation is used, the correct object 40 may be missed or an incorrect match with another object 47 may be generated.

In order to remove this risk, compensation may be used to increase the probability of detecting the correct match between the acquired image and the image in the annotation database. This compensation may include for example preprocessing of the image acquired by the annotating device 1 in order to compensate for the different viewing angle, for different lighting conditions (luminosity/color temperature/shadows etc) and more generally different conditions for image acquisition. This compensation may be based on data provided by other sensors, including location sensors, time and date information, etc, and on corresponding information associated with the reference image or 3D model. For example, knowing the date and time of the day may be used for lighting and light color compensation, and knowing the location and orientation from a GPS and compass can be used for compensating geometric deformation and parallax caused by changing angle of view. Generally, the aim of this compensation is to compute from the acquired image another image or data, for example an image corresponding to the conditions of image acquisition of the reference image or model, in order to make the matching process easier, faster and more robust. The compensation thus increases the probability of detecting the correct match between the acquired image and the image in the annotation database.

Position and orientation are determined with a certain error which leads to an uncertainty on the way of computing the compensated image. To this end, the space of likely positions and orientations can be sampled. For each sample a compensated image is computed and the image based technique is applied. For reducing the number of final candidates several techniques are feasible, such as:
- keeping the candidate(s) for the compensated image corresponding to the most likely positions and orientations of the camera;
- keeping the candidate(s) which gave the best match with the database image, e.g. those that gave the minimum mean squared error;
- keeping all candidates and compare the results with other above-described techniques, e.g. other sensor based techniques or 3D image based techniques.

The precision on the positions of the salient objects can be used to determine which annotations should be displayed on the resulting image. In fact, if the precision on the positions is not very high, it is more appropriate to reduce the level of detail of the annotations. A way of doing that is to organize the salient objects in a set of hierarchical levels corresponding to different resolutions.

Figure 11:
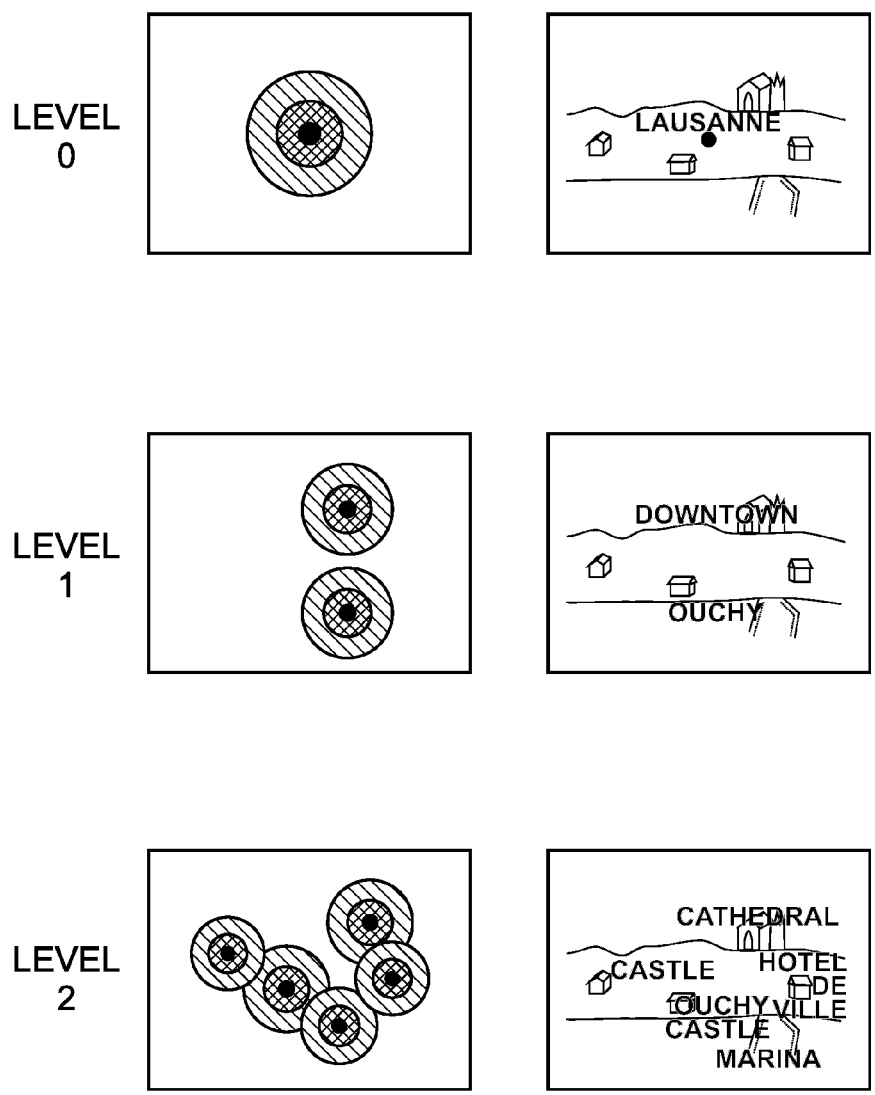
FIG. 11, in correspondence with Table 1, is an illustration of annotation for the three levels of resolution of salient objects.

An example is shown in Table 1 for three levels. The salient objects are organized into a tree shape where each node corresponds to a general description of the descendant nodes. The selection of the appropriate level is determined by computing the region of confusion for each object of the tree and finding the highest level for which the regions do not overlap. For each level, FIG. 11 shows the probability distribution and the resulting annotation. It is apparent that Level 2 gives a level of detail too high with respect to the obtained precision—the regions of uncertainty for the different objects overlap, and annotations may thus be associated with the wrong object in the picture. Level 0 is too coarse, since many salient objects are not annotated. Level 1 represents an optimal compromise. The determination of the level of detail can also be influenced by the user. For example, he can determine the range of levels to be considered in the hierarchy of salient objects. An alternative is to allow different levels of detail for the different parts of the image, according to the local precision on annotation positions. Moreover, the level of detail may also depend on the size of the annotations, of the distance between annotations and/or on the zooming factor during restitution, in order to avoid overlapping annotations.

TABLE 1

| Level 0 | | Lausanne | | | |
|---------|----------------|-----------|--------|--------|--------|
| Level 1 | | Downtown | | Ouchy | |
| Level 2 | Hotel de Ville | Cathedral | Castle | Marina | Ouchy Castle |

Hierarchical organization of salient objects represented here by their annotation text, organized in three levels of resolution.

The annotation system composed by the mobile annotating devices 1, the servers 3 and the databases 30 can be considered as a unitary entity where computations, annotation data, elevation data, communications, and sensing abilities can be distributed to the different components of the system. Access and use of each resource incurs a cost which can include all or parts of the communication cost, the delay in obtaining the resource, and the energy consumed. For example, the cost c can be computed as:

$$c = K\_c * C + K\_d * t\_d,$$

where C is the communication cost, t_d is the delay, and K_c, K_d are constants that controls the weight of each term.

Cost can be assigned in a different way by each portable device, according to the desired strategy. For example, Table 2 shows the costs associated with different mobile devices, different base stations and different servers:

TABLE 2

| Element | Computing | Communication | Sensing Position | Sensing Orientation | Annotation data for element 1 | Annotation data for element 2 |
|---|---|---|---|---|---|---|
| Mobile 1 | 100 | — | ∞ | 1 | 1 | ∞ |
| Mobile 2 | ∞ | 10 | 10 | 10 | 1 | 1 |
| Mobile 3 | ∞ | 10 | 15 | 5 | 1 | ∞ |
| Base station 1 | ∞ | 1 | 20 | 20 | ∞ | ∞ |
| Base station 2 | ∞ | 1 | 20 | 20 | ∞ | ∞ |
| Server 1 | 10 | 1 | ∞ | ∞ | 1 | 1 |

In the table, the symbol for infinity is used for resources that are not available on a certain device. In this example, the costs take into account the communication cost, the delay and the power consumption. The costs are set to infinity when a certain resource is not available. For example, "MOBILE 1" has no GPS; hence, the cost associated to determine the position is set to infinity for this resource. However, the position of this device can be obtained from another mobile device nearby, such as "MOBILE 2" by paying a price in terms of delay and communication.

The information needed to annotate the objects is also distributed on the components of the system. For example, in Table 2 two salient elements are considered. Data for annotating element 1 is available on "MOBILE 1"; hence, it can be accessed by paying a low price. The data for annotating the second element is not available in this mobile, and the cost is infinite. If this annotating data is needed, it can be retrieved from "MOBILE 2" or from "SERVER 1" by paying a communication cost and a delay.

In order to annotate an image, a mobile device needs a number of parameters. For example, for sensor based annotation, it needs position and orientation. There may be several ways to obtain this information. The information can be available directly on the device by means of sensors, it can be received from a device in the proximity, or it can be received from the communication network. Every option is associated to the cost described above and to a certain performance parameter. This parameter can be, for example, an indication of the associated reliability, and/or a measure of the error amplitude, such as the standard deviation. Exemplary performance parameters associated to the computation of position and orientation of "MOBILE1" are shown in Table 3. Performance can be measured by using error standard deviation, for example. A value set to infinity indicates that the device is not able to produce the desired quantity.

TABLE 3

| ELEMENT | SENSING POSITION | SENSING ORIENTATION |
|---|---|---|
| MOBILE 1 | ∞ | 10 |
| MOBILE 2 | 20 | 20 |
| MOBILE 3 | 30 | 30 |
| BASE 1 | 15 | 15 |
| BASE 2 | 25 | 25 |
| SERVER 1 | ∞ | ∞ |

Performance Parameters Associated to the Computation of Some Parameters by Different Resources In some cases the performances can be improved by combining different sources. For example, combining sensor-based and image-based techniques, as described above, can improve the standard deviation and other parameters. This can be done by paying a higher total cost.

Figure 12:
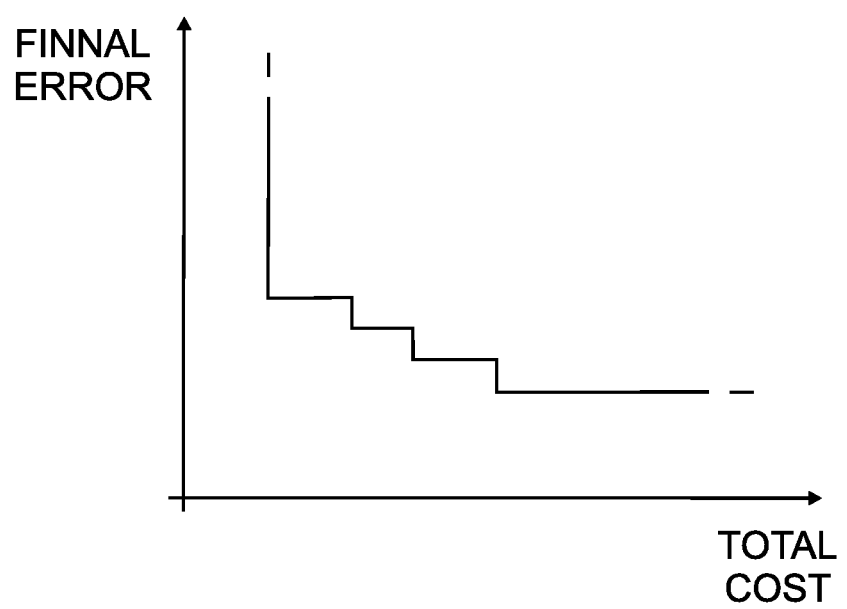
FIG. 12 is a graph of final error of position of annotation as a function of cost.

For a given total cost, it is possible to determine the optimal allocation of resources that maximizes the performances. The resulting final error on the annotation position is a function of the total cost. An example is shown in FIG. 12 that shows the final error as a function of the total cost. The final decision on the allocated resources and the resulting error can be taken dynamically by each annotating mobile device or at the level of the whole annotation system. The decision may be different for each annotating device, and even for each image to annotate.

Thus, the distribution of computation between the different mobile devices and the servers can be dynamically and automatically adjusted for each picture or each image annotating session, in order to improve a trade-off between the precision of annotation, the communication cost, the delay and/or the power consumption.

In one embodiment, the cost associated to the distribution of a certain resource from one device of the system or from one of the servers to the remaining devices is computed. A function similar to that depicted on FIG. 12 can be determined for each node of the system by analyzing the alternative at a given cost and selecting that with minimum error. The procedure can be repeated regularly to take into account device movements or modifications of the system. Complexity can be reduced by applying a simplified version of the algorithm, for example, by grouping resources or devices with similar cost and performances.

As described above, the annotation system is based on information stored in the salient objects database and the elevation database, as those represented in FIG. 3 and FIG. 4. These databases can be created by the service provider or by the users of the annotation system. It is also possible to allow the users to add new salient objects with the corresponding annotations. Moreover, the users can associate new images and 3D models to a certain salient object, and store those images and models in a central server in order to improve the precision and robustness of future image based annotation. This operation can be implemented by using the same portable devices used to produce the annotated images or devices particularly designed for this purpose. The user points the device in the direction of the salient object and the system acquires an image or a video sequence. The position and orientation of the device is computed by using the techniques mentioned above, this identifies the region pointed by the device. Different views of the same region can be collected over time, either by the same user or by different users. These views can be used by the system to reconstruct the 3D structure of the scene. One way to do that is to use triangulation on corresponding points of different views. The reconstructed 3D structure is used to create or update the elevation database. Moreover, if an existing salient object is contained in the views, the corresponding entry in the salient objects database can be updated, by adding images and 3D models. If the user selects a new salient object and enters the corresponding annotation, a new entry is created in the database. This will be later updated when new views will be collected. It is noted that this also can be realized by using the images regularly acquired for annotation.

Possible alternatives include simplifications of the presented method in order to reduce the number of computations or the size of the databases. A version particularly interesting consists in annotating images on the basis of the distance from the portable device. Each user receives annotated images of the surrounding objects and has the possibility to modify the existing annotations or to update new annotated images. With respect to the database represented in FIG. 3, only a collection of annotated images and the corresponding viewing position need to be stored. There is no need for the elevation database.

To increase the quality of the annotations, in terms of content, positions, and robustness, additional sources of information can be used, such as, topographic data, geotagged high quality videos and images, and 3D cameras. This data can be uploaded or linked to the annotation system and integrated or made available to the existing databases.

A profound way to produce content for the annotation databases is to use information available on the web. The first way to do that is to use database of images associated to geographical locations. Examples of such databases includes "panoramio", "street view", and "flickr". These databases can be analyzed in order to produce entries for the salient object database. The entries can be created/updated by using the indexes associated to the images as annotation text and the images as a model for image-based annotation.

Another possibility is to use programs that scan the web in order to find images associated with annotation information and geographic position. These programs can analyze, for example, the web sites of the main cities and produce annotation data for historical buildings, public institutions, museums, shops and the like.

The method and system can also be used for annotating persons, using for example face recognition algorithms combined with detection of Bluetooth and other signals emitted by people personal devices. In this case, the annotating data and the reference images may be retrieved for example from social network platforms.

The invention claimed is:

1. A computerized method for placing an annotation on an image of a scene, comprising the steps of:
   (a) obtaining an original image of said scene with a camera;
   (b) determining a geographic location of said camera with a location sensor;
   (c) determining an orientation of the camera with a compass;
   (d) using either one of a computer vision algorithm or an image processing technique to determine similarities between visual features of said image and a reference images or models;
   (e) determining a first probability that one said visual feature at a first position in said image corresponds to said reference image or model, based on said geographic location determined from said location sensor, on information from said one of said computer vision algorithm or said image processing technique, and on the orientation of the camera;
   (f) determining a second probability that one said visual feature at at least a second position in said image corresponds to said reference image or model, based on said geographic location determined from said location sensor, on information from said one of said computer vision algorithm or said image processing technique, and on the orientation of the camera;
   (g) obtaining an annotation for said reference image of model;
   (h) determining an annotation position suitable for annotating said first position if said first probability is the highest, or suitable for annotating said second position if said second probability is the highest;
   (i) forming an annotated image by including said annotation at said annotation position.

2. The method of claim 1, wherein said annotation position is determined by a plurality of methods.

3. The method of claim 2,
   wherein each of said methods delivers a probability distribution function depending on each of said plurality of methods, and
   wherein the annotation is included at the annotation position determined by combining a plurality of said probability distribution functions given by each of said plurality of methods.

4. The method of claim 2, wherein different precisions of positioning of said annotations are associated with each of said plurality of methods, and wherein a computation of said annotation position is based on the most precise of said plurality of methods.

5. The method of claim 4, wherein a precision distribution function indicates the precision of positioning given by at least one method at different points of said image.

6. The method of claim 2, wherein different reliabilities of positioning said annotation are associated with each method, so as to determine a most reliable method, and
   wherein a computation of said annotation position is based on the most reliable methods.

7. The method of claim 6, wherein a reliability distribution function indicating a reliability of at least one method at different points of said image.

8. The method of claim 2, wherein a cost associated with each method in term of communication costs between mobile devices and servers and delay in communication between said mobile devices and said servers is computed, so as to determine the less expensive method among said each method and
   wherein a computation of said position is based on the less expensive methods.

9. The method of claim 1, further comprising pre-processing said image based on said position and an orientation of said camera to compensate for a geometrical deformation of said image.

10. The method of claim 1, further comprising determining a precision of location of said visual feature; and
    adjusting a level of resolution of said annotation according to said precision.

11. An annotating device capable of placing an annotation on an image of a scene, comprising:
    (a) a camera obtaining an original image of said scene;
    (b) a location sensor for determining a geographic location of said annotating device;
    (c) a compass for determining an orientation of said camera;

(d) either one of a computer vision algorithm or an image processing technique for determining similarities between visual features of said image and a reference images or models;
(e) computing means for determining a first probability that one said visual feature at a first position in said image corresponds to said reference image or model, based on said geographic location determined from said location sensor, on information from said one of a computer vision algorithm or an image processing technique, and on the orientation of the camera;
(f) computing means for determining a second probability that one said visual feature at at least a second position in said image corresponds to said reference image or model, based on said geographic location determined from said location sensor, on information from said one of a computer vision algorithm or an image processing technique, and on the orientation of the camera;
(g) computing means for obtaining an annotation for said reference image or model;
(h) computing means for determining an annotation position suitable for annotating said first position if said first probability is the highest, or suitable for annotating said second position if said second probability is the highest, and for forming an annotated image by including said annotation at said annotation position.

* * * * *

UNITED STATES PATENT AND TRADEMARK OFFICE
CERTIFICATE OF CORRECTION

PATENT NO. : 9,953,438 B2
APPLICATION NO. : 13/060777
DATED : April 24, 2018
INVENTOR(S) : Luciano Sbaiz et al.

Page 1 of 1

It is certified that error appears in the above-identified patent and that said Letters Patent is hereby corrected as shown below:

On the Title Page

Item (73) Assignee:, change "Ecole Polytechnic Federale De Lausanne (EPFL)" to
--Ecole Polytechnique Federale De Lausanne (EPFL)--.

Signed and Sealed this
Seventh Day of January, 2020

Andrei Iancu
*Director of the United States Patent and Trademark Office*